(12) United States Patent
Jung et al.

(10) Patent No.: US 11,413,976 B2
(45) Date of Patent: Aug. 16, 2022

(54) CHARGING CABLE AND COMMUNICATION DEVICE COMMUNICATING WITH THE SAME

(71) Applicants: HYUNDAI MOTOR COMPANY, Seoul (KR); KIA MOTORS CORPORATION, Seoul (KR); YURA CORPORATION CO., LTD., Seongnam-si (KR)

(72) Inventors: Yun Jae Jung, Suwon-si (KR); Dae Hwan Kwon, Seongnam-si (KR); Myeong Jin Kwon, Suwon-si (KR)

(73) Assignees: HYUNDAI MOTOR COMPANY, Seoul (KR); KIA MOTORS CORPORATION, Seoul (KR); YURA CORPORATION CO., LTD., Seongnam-si (KR)

( * ) Notice: Subject to any disclaimer, the term of this patent is extended or adjusted under 35 U.S.C. 154(b) by 459 days.

(21) Appl. No.: 16/579,146

(22) Filed: Sep. 23, 2019

(65) Prior Publication Data
US 2020/0189416 A1 Jun. 18, 2020

(30) Foreign Application Priority Data
Dec. 18, 2018 (KR) .......................... 10-2018-0164609

(51) Int. Cl.
*B60L 53/18* (2019.01)
*B60L 53/66* (2019.01)
(Continued)

(52) U.S. Cl.
CPC ............... *B60L 53/18* (2019.02); *B60L 53/16* (2019.02); *B60L 53/66* (2019.02); *G06F 8/65* (2013.01);
(Continued)

(58) Field of Classification Search
CPC ....................................................... B60L 53/18
(Continued)

(56) References Cited

U.S. PATENT DOCUMENTS 8,860,559 B2 10/2014 Ichihara
2012/0098490 A1\* 4/2012 Masuda ................ B60L 3/0069
320/109
(Continued)

FOREIGN PATENT DOCUMENTS

JP 58-55212 B1 2/2016
KR 101389649 B1 4/2014
(Continued)

*Primary Examiner* — Jerry D Robbins
(74) *Attorney, Agent, or Firm* — McDonnell Boehnen Hulbert & Berghoff LLP

(57) ABSTRACT

A charging cable includes: a plurality of pins; a storage configured to store software, which controls communication with a communication device connected through at least one of the plurality of pins, controls communication with a charging object connected through the plurality of pins, controls charging of the charging object and monitors the charging; and a controller configured to: when a first voltage is applied to the at least one pin of the plurality of pins, control to output a pulse width modulation (PWM) signal having a predetermined first duty ratio corresponding to a communication enabled state with the communication device through the at least one pin; and when a second voltage is applied to the at least one pin, change to an update mode and control to output the PWM signal having a predetermined second duty ratio corresponding to the change to the update mode through the at least one pin.

21 Claims, 11 Drawing Sheets

(51) Int. Cl.
*H02J 7/00* (2006.01)
*H01R 24/28* (2011.01)
*H04L 25/49* (2006.01)
*H04B 3/54* (2006.01)
*G06F 8/65* (2018.01)
*B60L 53/16* (2019.01)
*H01R 107/00* (2006.01)
*H04W 4/48* (2018.01)
*B60K 6/28* (2007.10)

(52) U.S. Cl.
CPC ............ *H01R 24/28* (2013.01); *H02J 7/0045* (2013.01); *H04B 3/542* (2013.01); *H04L 25/4902* (2013.01); *B60K 6/28* (2013.01); *B60Y 2200/91* (2013.01); *B60Y 2200/92* (2013.01); *B60Y 2300/91* (2013.01); *H01R 2107/00* (2013.01); *H01R 2201/26* (2013.01); *H04W 4/48* (2018.02)

(58) Field of Classification Search
USPC .......................................................... 320/109
See application file for complete search history.

(56) References Cited

U.S. PATENT DOCUMENTS

2014/0035527 A1* 2/2014 Hayashigawa ....... B60L 53/305
320/109
2019/0061539 A1* 2/2019 Spilger ................... B60L 53/16

FOREIGN PATENT DOCUMENTS

| | | |
|---|---|---|
| KR | 101452575 B1 | 10/2014 |
| KR | 101524166 B1 | 6/2015 |
| KR | 101560657 B1 | 10/2015 |
| KR | 2018-0061650 A | 6/2018 |

\* cited by examiner

CHARGING CABLE AND COMMUNICATION DEVICE COMMUNICATING WITH THE SAME

CROSS-REFERENCE TO RELATED APPLICATION(S)

This application is based on and claims priority under 35 U.S.C. § 119 to Korean Patent Application No. 10-2018-0164609, filed on Dec. 18, 2018 in the Korean Intellectual Property Office, the disclosure of which is incorporated by reference in its entirety.

TECHNICAL FIELD

Embodiments of the disclosure relate to a communication device that controls data transmission and reception, a charging cable that communicates with the communication device and transmits charging power to a vehicle, and a method of controlling the charging cable and the communication device for performing communication with each other.

BACKGROUND

Vehicles include motor vehicles (conventional engine-driven cars) driven with mechanical power produced by burning fuel oil, such as gasoline and diesel, and eco-friendly vehicles driven by electrical power so as to reduce the amount of harmful fuel emissions and increase fuel efficiency.

The eco-friendly vehicles include electric vehicles having a rechargeable power supply comprised of a battery and a motor, rotating the motor with electricity charged in the battery, and driving car wheels using the rotation of the motor; and hybrid vehicles having an engine, a battery, and a motor and driven by controlling the mechanical power of the engine and the electrical power of the motor.

The hybrid vehicles include plug-in hybrid vehicles having a plug that can be connected to external electricity and that can charge the battery when connected to the external electricity.

The eco-friendly vehicles may be supplied external commercial power through a charging cable and charge the battery using the supplied power.

That is, when the plug of the charging cable is connected from an outlet of the commercial power and a connector of the charging cable is connected to a charging port of the vehicle, the vehicle is supplied with the commercial power through the charging cable.

The charging cable has a control box for supplying and disconnecting the commercial power. A case of the control box is integrally assembled by bolting or ultrasonic welding to protect the inside.

When the case of the control box of the charging cable is assembled by bolts, the size of the case of the control box becomes large, which increases the cost and weight of the charging cable, and waterproofing is difficult.

When the case of the control cable box of the charging cable is assembled by the ultrasonic welding, it is impossible to disassemble the case of the control box and the case must be broken for an After Service (A/S: After selling a product, the manufacturer is responsible for the installation, repair, and inspection of the product), which causes internal parts to be damaged and the A/S is impossible.

In addition, after the case is assembled, it is necessary to change software by adding or deleting functions by customer request and changing the international standard, and the software of the control box cannot be updated without breaking the case. Thus, there is a problem that it is difficult to flexibly cope with customer request.

Furthermore, if a wireless communication module is mounted in the control box to update the software of the control box without disassembling the case of the control box of the charging cable, the cost of the charging cable is increased.

SUMMARY

Therefore, it is an aspect of the disclosure to provide a communication device for updating software in a charging cable using a pin provided on the charging cable, and the charging cable communicating with the communication device, and methods of controlling the communication device and the charging cable.

It is another aspect of the disclosure to provide a communication device and a method of controlling the communication device for transmitting either a first voltage for recognizing a connection state or a second voltage for recognizing an update mode to the charging cable, and a charging cable and a method of controlling the charging cable for determining whether to perform the update mode based on a voltage value received from the communication device.

Additional aspects of the disclosure will be set forth in part in the description which follows and, in part, will be obvious from the description, or may be learned by practice of the disclosure.

In accordance with an aspect of the disclosure, a charging cable includes: a plurality of pins; a storage configured to store software, which controls communication with a communication device connected through at least one of the plurality of pins, controls communication with a charging object connected through the plurality of pins, controls charging of the charging object and monitors the charging; and a controller configured to: when a first voltage is applied to the at least one pin of the plurality of pins, control to output a pulse width modulation (PWM) signal having a predetermined first duty ratio corresponding to a communication enabled state with the communication device through the at least one pin; and when a second voltage is applied to the at least one pin, change to an update mode and control to output the PWM signal having a predetermined second duty ratio corresponding to the change to the update mode through the at least one pin.

The controller may include a data transmitter configured to transmit data when communicating with the communication device; and a control pilot (CP) outputter configured to output the PWM signal of the first duty ratio or the PWM signal of the second duty ratio.

The charging cable may further include: a signal outputter configured to output either a signal corresponding to the data input from the data transmitter or the PWM signal input from the CP outputter.

The at least one pin may include a control pilot pin. The signal outputter may include a first input terminal to which the CP outputter is connected, a second input to which the data transmitter is connected, and an output terminal coupled to the control pilot pin.

The data transmitter may output a high signal when outputting the PWM signal of the first duty ratio or the PWM signal of the second duty ratio through the CP outputter.

The CP outputter may output the PWM signal having a duty ratio of 100% when the data is transmitted through the data transmitter.

The at least one pin may include a control pilot pin. The charging cable may further include: a voltage changer configured to change a voltage applied to the control pilot pin to a voltage to be recognized by the controller.

The voltage changer may include a plurality of input terminals; and a second circuit configured to output any one of a plurality of signals input through the plurality of input terminals.

The charging cable may further include: a connector provided with the plurality of pins; a plug configured to connect to external commercial power; and a control box provided between the connector and the plug, the control box having a case accommodating the controller and the storage. The case is provided in a hermetically sealed manner.

In accordance with another aspect of the disclosure, a communication device includes: a terminal portion connected to two pins of a plurality of pins provided on a charging cable; and a controller configured to: when a voltage of the charging cable is applied to the two pins, adjust the voltage of the two pins to a first voltage to identify a communication enabled state with the charging cable; when a pulse width modulation (PWM) signal of a predetermined first duty ratio is received through the two pins, perform communication with the charging cable; when it is determined that updating of software in the charging cable is necessary during communication with the charging cable, adjust the voltage of the two pins to a second voltage; and when the PWM signal of a predetermined second duty ratio is received through the two pins, control to transmit data for updating to the charging cable.

The controller may determine that communication with the charging cable is enabled when the PWM signal of the first duty ratio is received; and determine that the charging cable has been changed to an update mode when the PWM signal of the second duty ratio is received through the two pins.

The controller may change the voltage of the two pins to the first voltage to inform transmission of the data for updating when the PWM signal of the second duty ratio is received.

The communication device may further include: a diode and resistors configured to change the applied voltage to a voltage to be recognized by the controller when the voltage of the charging cable is applied to the two pins.

The communication device may further include: at least one switch element configured to perform at least one of inverting a signal and removing noise corresponding to the data when transmitting the data for updating.

The communication device may further include: a comparator and at least one resistor configured to perform at least one of inverting the signal and removing the noise corresponding to the data.

The controller may transmit data for updating at a predetermined time interval when updating the software of the charging cable, and to receive a response signal from the charging cable at the predetermined time interval.

The communication device may further include: a communicator configured to communicate with an external terminal. The controller may control the updating of the charging cable based on update information received through the communicator.

The controller may store the update information received through the communicator.

The communication device may further include: a display configured to display at least one of communication information and update information with an interface.

In accordance with another aspect of the disclosure, a method of controlling a charging cable includes: when a voltage received through a control pilot pin of a plurality of fins is a first voltage, outputting a pulse width modulation (PWM) signal of a first duty ratio as a response signal; when the voltage applied through the control pilot pin is a second voltage, changing to an update mode and outputting the PWM signal of a second duty ratio as the response signal; when the voltage applied through the control pilot pin is the first voltage, recognizing received data as the data for updating; and updating software using the received data.

In accordance with another aspect of the disclosure, a method of controlling a communication device includes: when a voltage is applied through two pins of a plurality of pins provided on a charging cable, changing the voltage applied to the two pins to a first voltage; when receiving a pulse width modulation (PWM) signal of a first duty ratio, performing communication with the charging cable; determining whether an update of the charging cable is necessary; when it is determined that updating of the charging cable is necessary, changing the voltage applied to the two pins to a second voltage; when the PWM signal of a second duty ratio is received, changing the voltage applied to the two pins to a first voltage; and transmitting data for updating to the charging cable.

The transmitting of the data for updating to the charging cable may include transmitting the data for updating at a predetermined time interval; determining whether a response signal is received from the charging cable at the predetermined time interval; and maintaining transmission of the data for updating when the response signal is received from the charging cable.

The method may further include: performing communication with an external terminal; receiving the data for updating from the external terminal; and transmitting the received data for updating to the charging cable.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
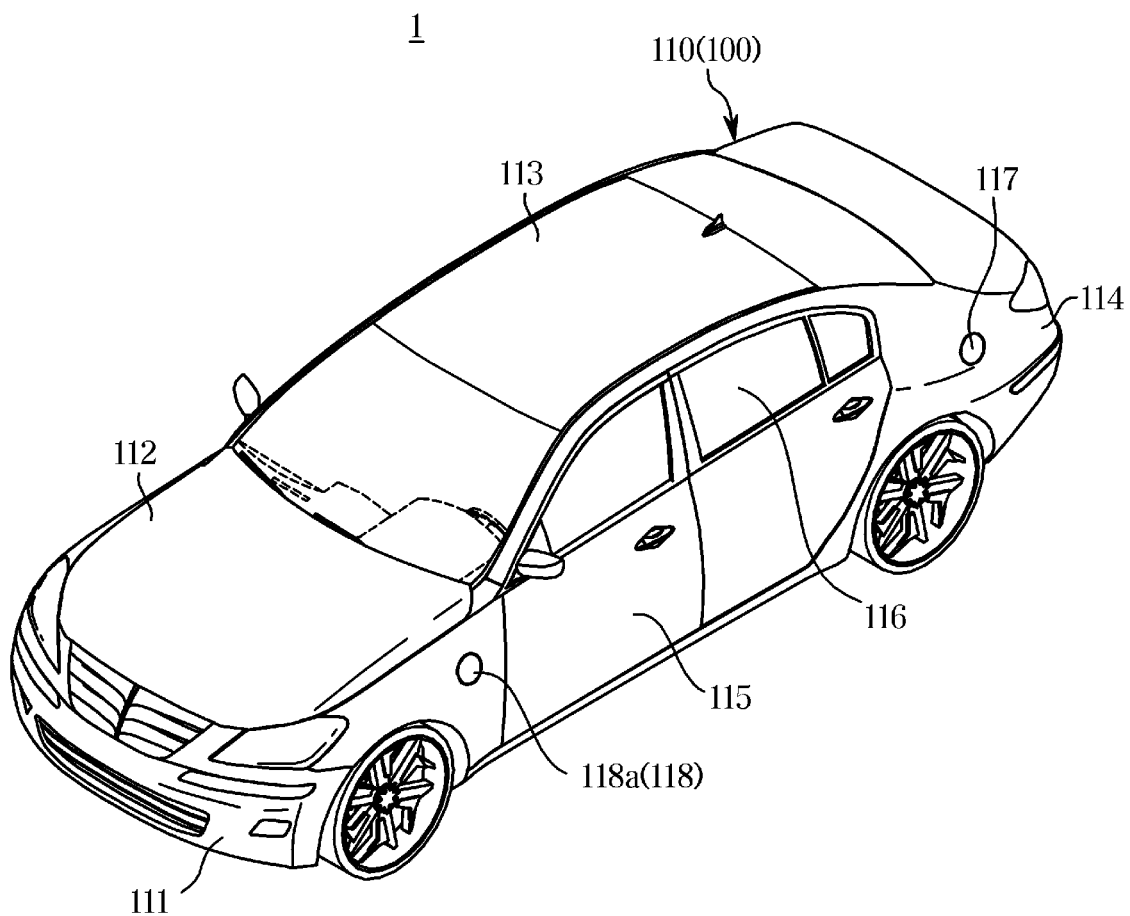
FIG. 1 is a view illustrating an appearance of a vehicle to which a charging cable is connected according to embodiments of the disclosure.

Like reference numerals refer to like elements throughout the specification. Not all elements of the embodiments of the disclosure will be described, and the description of what are commonly known in the art or what overlap each other in the embodiments will be omitted. The terms as used throughout the specification, such as "~part," "~module," "~member," "~device," "~block," etc., may be implemented in software and/or hardware, and a plurality of "~parts," "~modules," "~members," "~devices," or "~blocks" may be implemented in a single element, or a single "~part," "~module," "~member," "~device," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and the embodiments of the disclosure will be described with reference to the accompanying drawings.

Figure 2:
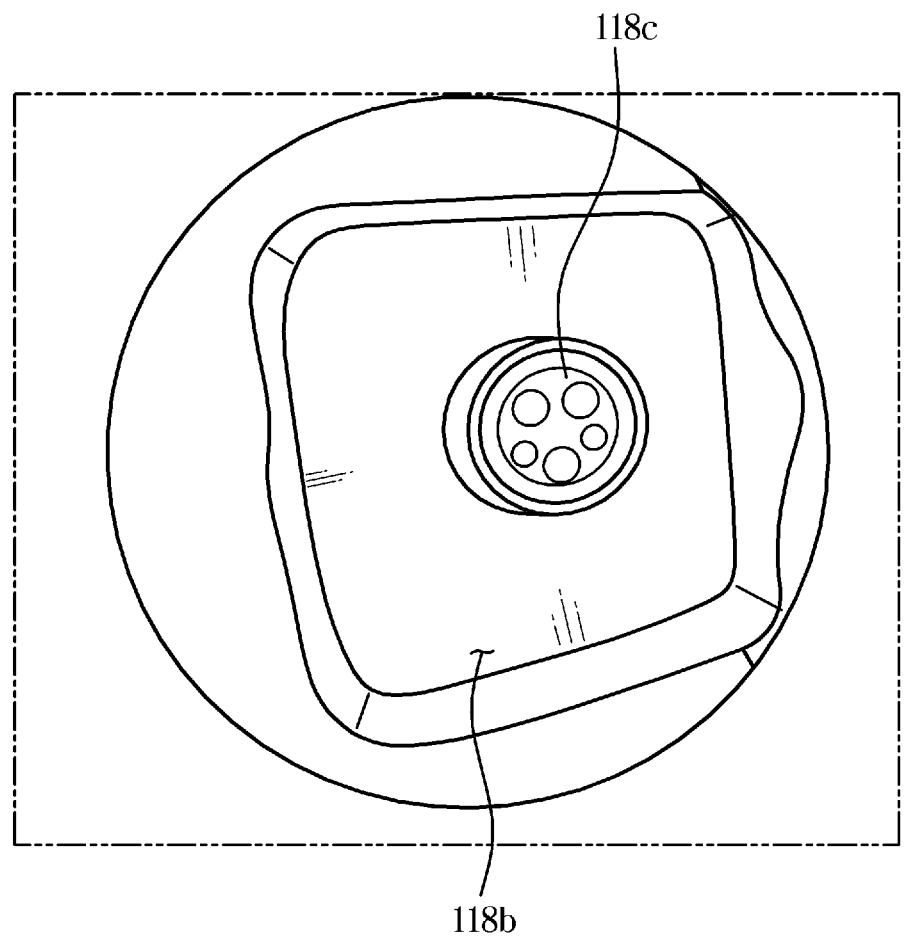
FIG. 2 is a view illustrating a charger of a vehicle illustrated in FIG. 1.
Figure 3:
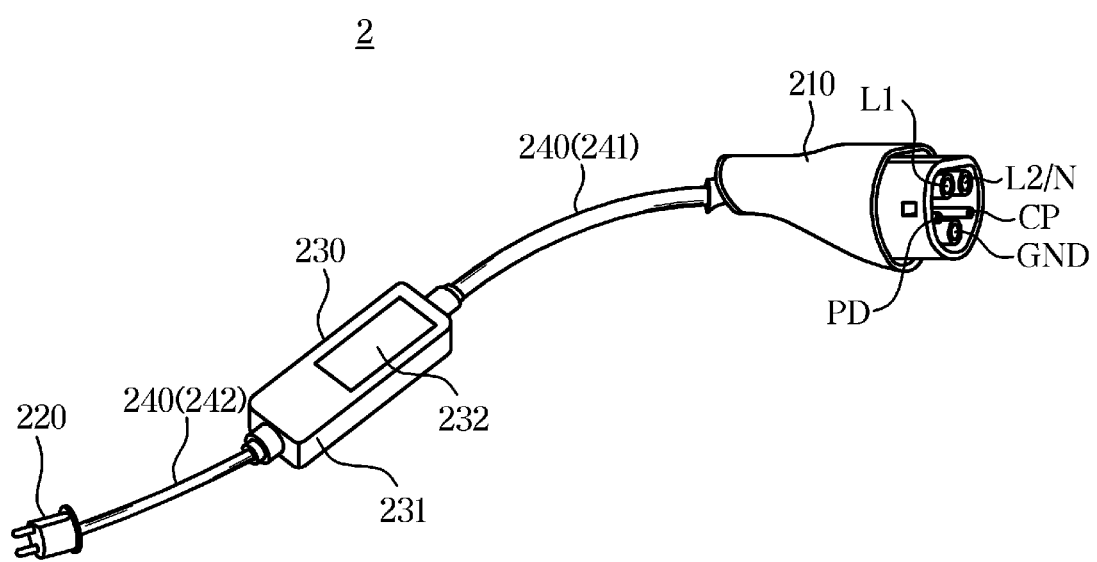
FIG. 3 is a view illustrating a charging cable according to embodiments of the disclosure.

FIG. 1 is a view illustrating an appearance of a vehicle to which a charging cable is connected according to embodiments of the disclosure, FIG. 2 is a view illustrating a charger of a vehicle illustrated in FIG. 1, and FIG. 3 is a view illustrating a charging cable according to embodiments of the disclosure.

A vehicle according to an embodiment is an eco-friendly vehicle that drives using a battery and a motor, and may include an electric vehicle or a Plug-in Hybrid Electric Vehicle (PHEV).

A vehicle 1 may include a car body 100 with exterior parts 110 and interior parts, and other parts, i.e., chassis, on which mechanical devices required for driving are installed.

As illustrated in FIG. 1, the exterior parts 110 of the car body 100 may include a front panel 111, a bonnet 112, a roof panel 113, a rear panel 114, front-left, front-right, rear-left, and rear-right doors 115, and a window glasses 116 configured at the front-left, front-right, rear-left, and rear-right doors 115 to be opened and closed.

The exterior parts 110 of the car body 100 may include a filler provided at a boundary between the window glasses 116 of the front-left, front-right, rear-left, and rear-right doors 115, a side mirror that provides a driver with a rear view of the vehicle 1, and external lamps that make it easy to see surrounding information while watching a front view and perform functions of signaling and communicating to other vehicles and pedestrians.

The chassis of the vehicle 1 is a frame to support the car body 100, having car wheels equipped at the front and rear and on the left and right of the vehicle 1, a power system for applying power to the car wheels, a steering system, a brake system for applying a braking force to the car wheels, and a suspension system arranged thereon.

The power system may include a power generating device and a power transmitting device.

In the case of the electric vehicle, the power generating device may include the battery and the motor.

In the case of the hybrid vehicle, the power generating device may include the battery, the motor, an engine, a fuel device, a cooling device, and a refueling device.

The battery may be a main battery that generates a high-voltage current to supply a driving force to the vehicle 1.

The motor may convert an electric energy of the battery into a dynamic energy for operating various devices provided in the vehicle 1.

In the case of the hybrid vehicle, the vehicle 1 may operate the motor when a start button is turned on, and drive the engine through the operation of the motor. In addition, the hybrid vehicle may be the PHEV that charges the battery using external power.

In the case of the electric vehicle, the vehicle 1 may supply a maximum current to the motor so that a maximum torque is generated when the start button (or a booting button) is turned on.

The power transmission device may include at least one of a clutch, a transmission, a final reduction device, a differential device, and an axle.

The vehicle 1 may further include a charger provided at the exterior parts 110 of the car body 100, connected to a charging cable and receiving power for charging the battery.

The charger may include a high-speed charger 117 for quick charging the battery and a slow-speed charger 118 for charging the battery to a slower rate than a rapid charging rate.

A cable for the quick charging may be connected to the high-speed charger 117, and a cable for slow charging may be connected to the slow-speed charger 118.

It is also possible to have the high-speed charger 117 for quick charging and the slow-speed charger 118 for the slow charging at a slower charging rate than the quick charging at the same location on the exterior parts 110 of the vehicle 1. That is, the vehicle 1 may include only one charger integrally provided in the exterior parts 110 of the vehicle 1. In this case, the one charger may be equipped with a high-speed charging inlet and a slow-speed charging inlet.

Embodiments describe the vehicle 1 having the slow-speed charger 118 (hereinafter, referred to as the 'charger') for charging the battery at a slow rate.

The vehicle 1 may further include a charging cap 118a of the charger 118.

As illustrated in FIG. 2, the charger 118 may include a receiving portion 118b which is opened and closed by the charging cap 118a and has a receiving space, and a charging inlet 118c disposed in the receiving portion 118b and into which the connector of a charging cable 2 (see FIG. 3) is inserted. In addition, the charging inlet 118c may be provided in the form of an outlet.

The charging inlet 118c may be the outlet through which a 5-pin connector is inserted or connected, or the outlet through which a 7-pin connector is inserted and connected.

In embodiments, the charging inlet 118c in which the 5-pin connector is inserted and connected will be described as an example.

As illustrated in FIG. 3, the charging cable 2 may be the cable that transmits power of single-phase alternating current (AC). The charging cable 2 may include a connector 210 having a live pin L1, a neutral pin L2/N, a ground pin GND, a proximity detection pin PD, and a control pilot pin CP as a control confirmation pin and a plug 220 connected to the outlet of AC commercial power.

The charging cable 2 may include an In Cable Control Box (ICCB) (hereinafter, referred to as the 'control box') 230 that allows charging to be performed between the vehicle 1 and the commercial power, the connector 210, and a cable member 240 connecting the plug 220 and the control box 230.

The control box 230 may include a case 231 that forms the appearance of the control box 230 and a first display 232 that displays charging information such as charging preparation, charging failure, charging, and charging completion.

A circuit board for controlling charging of the vehicle 1 and communication with the vehicle 1 may be provided inside the case 231 of the control box 230.

The case 231 of the control box 230 may be formed in a closed state or may be integrally formed.

The control box 230 may further include an inputter for receiving charging commands such as start of charging, stop of charging, and the like. The inputter may be provided in the connector 210.

The cable member 240 may include a first cable member 241 connecting the connector 210 and the control box 230, and a second cable member 242 connecting the plug 220 and the control box 230.

The charging cable 2 may be the cable for charging in a groove.

In addition, when the connector 210 of the charging cable is provided with 7 pins, the connector 210 may be a three-phase AC connector and may further include L2 and L3 pins.

The interaction between the vehicle 1 and the charging cable 2 will be briefly described.

The charging cable 2 may connect the commercial power to the vehicle 1, and then may transmit the power of the commercial power to the vehicle 1.

The control box 230 of the charging cable 2 may determine whether the connector 210 of the charging cable 2 is connected to the charging inlet 118c of the vehicle 1 based on the signal of the proximity detection pin PD.

The vehicle 1 may also determine whether the connector 210 of the charging cable 2 is connected to the charging inlet 118c of the vehicle 1 based on the signal of the proximity detection pin PD. When it is determined that the connector 210 of the charging cable 2 is connected to the charging inlet 118c of the vehicle 1, the vehicle 1 may control the vehicle 1 so that the vehicle 1 cannot be moved. In addition, the vehicle 1 may be also capable of receiving connection information from the control box 230 of the charging cable 2.

The charging cable 2 may transmit the power received through the live pin L1, the neutral pin L2/N, and the ground pin GND of the connector 210 to the vehicle 1.

The vehicle 1 may convert the received 220V AC power to DC and charge the battery with the converted DC power.

The control box 230 of the charging cable may perform a communication mode for monitoring a state of charge (SOC) of the battery of the vehicle 1 based on the signal of the control pilot pin CP. That is, the control box 230 of the charging cable 2 may receive the charging information of the battery of the vehicle 1 during charging.

The vehicle 1 may also transmit the charging information of the battery of the vehicle 1 to the control box 230 of the charging cable 2 and display the charging information of the battery of the vehicle 1 through the display provided in the vehicle 1 by communicating with the control box 230 of the charging cable 2.

In addition, when the charging cable 2 is connected between the vehicle 1 and the charger such as a charging station, the vehicle 1 may also possible to perform the communication mode for mutual monitoring between the vehicle 1 and the charger.

Figure 4:
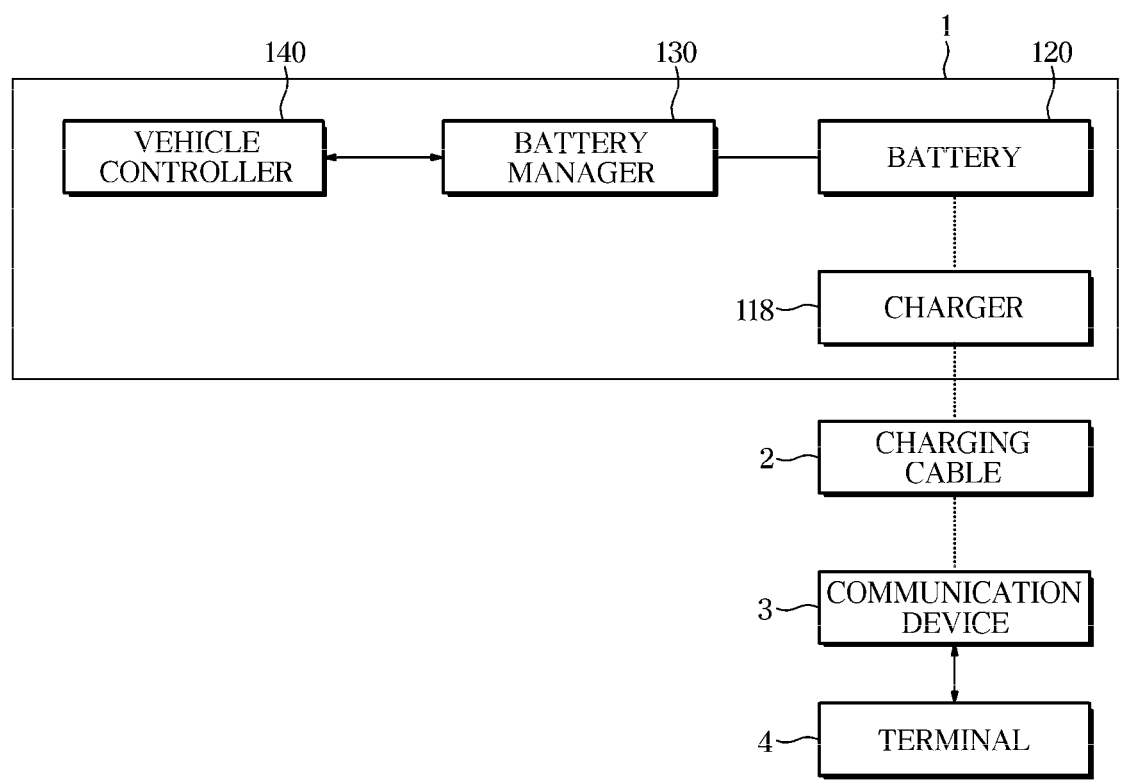
FIG. 4 is a block diagram of a vehicle and a communication device that communicate with a charging cable according to embodiments of the disclosure.

FIG. 4 is a control block diagram of a vehicle that communicates with a charging cable according to embodiments of the disclosure.

The vehicle 1 may include the charger 118, a battery 120, a battery manager 130, and a vehicle controller 140.

The charger 118 may further include a converter for converting AC power into DC of the battery 120.

That is, the charger 118 may convert the received 220 V AC power to DC using the converter and charge the battery 120 with the converted DC power.

The charger 118 may receive the signal of the proximity detection pin PD and the signal of the control pilot pin CP provided in the connector 210 of the charging cable 2 and transmit the received signals of the proximity detection pin PD and the control pilot pin CP to the vehicle controller 140.

The battery 120 may be a rechargeable battery that performs charging and discharging.

The battery 120 may apply the charged power to the motor (not shown).

The battery 120 may perform charging using power supplied from the motor that performs a power generation function in a regenerative braking mode of the vehicle 1.

The motor may apply a driving force to the car wheels when the vehicle 1 is accelerating or constant speed driving of the vehicle 1, and perform the power generation function when the vehicle 1 is decelerating or stopping.

The regenerative braking mode and the motor performing the power generation function may include performing the charging using a current due to a back electromotive force generated in the motor.

The battery manager 130 may monitor the state of charge (SOC) of the battery 120 to manage charging and discharging of the battery 120, thereby preventing overcharge and overdischarge of the battery 120.

The battery manager 130 may transmit SOC information on the monitored SOC of the battery 120 to the vehicle controller 140. The SOC of the battery 120 may include charging amount of the battery 120.

The battery manager 130 may include a SOC detector (not shown) for detecting the SOC of the battery 120.

More specifically, the battery manager 130 may detect at least one of the current, voltage, and temperature of the battery 120 using the SOC detector, and based on at least one of the current, voltage, and temperature of the battery 120, determine the SOC of the battery 120 and manage the battery 120 so that the battery 120 is charged and discharged based on the determined SOC of the battery 120.

The SOC detector may include a current detector that detects the current of the battery 120, and a voltage detector that detects the voltage of an output terminal of the battery 120 and a temperature detector that detects the temperature of the battery 120.

The battery manager 130 may monitor the SOC of the battery 120 based on the detected current of the battery 120.

The battery manager 130 may monitor the SOC of the battery 120 based on the detected current and voltage of the battery 120.

The battery manager 130 may monitor the SOC of the battery 120 based on the current, voltage, and temperature of each cell of the battery 120.

The vehicle controller 140 may receive the charging information of the battery 120 of the vehicle 1 from the battery manager 130 and control the display to display the charging information of the battery 120 of the vehicle 1 through the display provided in the vehicle 1.

The vehicle controller 140 may transmit the charging information of the battery 120 received during a charging mode to the control box 230 of the charging cable 2 and may control the display to display the charging information of the battery 120 being charged.

The vehicle controller 140 may receive the signal of the proximity detection pin signal PD provided in the connector 210 of the charging cable 2 and determine whether the connector 210 of the charging cable 2 is connected to the charging inlet 118c of the vehicle 1 based on the received signal of the proximity detection pin.

When it is determined that the connector 210 of the charging cable 2 is connected to the charging inlet 118c of the vehicle 1, the vehicle controller 140 may control the vehicle 1 so that the vehicle 1 cannot be moved and may control the display to display the connection information of the charging cable 2 through the display.

When it is determined that the connector 210 of the charging cable 2 is disconnected from the charging inlet 118c of the vehicle 1, the vehicle controller 140 may control the vehicle 1 so that the vehicle 1 is moved and may control the display to display the connection information of the charging cable 2 through the display.

The vehicle controller 140 may also receive the connection information from the control box 230 of the charging cable 2 and control the display to display the connection information of the charging cable 2 through the display.

The vehicle controller 140 may determine charging error and the charging completion based on the SOC of the battery 120 during the charging mode and may control the display to display the charging information such as the determined charging error and charging completion.

The vehicle controller 140 may determine whether the charging mode is a high-speed charging mode or a slow-speed charging mode based on the connection information of the charging cable 2 connected to the charging inlet 118c and may control the display to display the determined charging mode.

The configuration for recognizing the voltage between the vehicle 1 and the charging cable 2 and for performing charging will be described.

The charging cable 2 may be supplied with the external commercial power through the plug 220 and may be used as driving power. At this time, the voltage applied to the control pilot pin CP of the charge cable 2 may be the voltage of approximately 12V.

When the charging cable 2 is connected to the vehicle 1, the voltage applied to the control pilot pin CP by a resistance provided inside the vehicle 1 may be changed to a DC voltage of approximately 9V.

At this time, the control box 230 of the charging cable 2 may recognize the voltage changed by 9V to determine that the charging cable 2 is connected to the vehicle 1 and perform pulse width modulation of the voltage applied to the control pilot pin CP so that the voltage between −12V and 9V is output through the control pilot pin CP.

When the vehicle 1 recognizes the DC voltage between −12V and 9V and recognizes that charging is possible, the control box 230 may lower the voltage of the control pilot pin CP through the pulse width modulation so that the DC voltage between −12V and +3V is output.

And the control box 230 of the charging cable 2 may control an operation of a relay so that charging of the vehicle 1 can be performed when the voltage between −12V and 3V is recognized.

The vehicle controller 140 may be implemented with the memory storing an algorithm to control operation of the components in the vehicle 1 or data about a program that implements the algorithm, and the processor carrying out the aforementioned operation using the data stored in the memory. The memory and the processor may be implemented in separate chips. Alternatively, the memory and the processor may be implemented in a single chip.

The vehicle controller 140 may be an electronic control unit (ECU) that controls the driving of the vehicle 1, and may be any one of a microcomputer, a CPU, and the processor.

The charging cable 2 may, in addition to the vehicle 1, communicate with a communication device 3 and receive information for updating software from the communication device 3.

The charging cable 2 may be connected to the communication device 3 through the connector 210 wherein the control pilot pin CP and the ground pin GND in the connector 210 may be connected to the communication device 3. The charging cable 2 will be described later.

The communication device 3 may communicate with a terminal 4 in addition to the charging cable 2.

The communication device 3 may receive update information for updating the software of the charging cable 2 from the terminal 4 and store the received update information and transmit the update information to the charging cable 2 when the charging cable 2 is connected to update the software of the charging cable 2.

The terminal 4 may be implemented as a computer or a portable terminal capable of connecting to the communication device 3 through a network.

The computer may include, for example, a notebook, a desktop, a laptop, a tablet PC, a slate PC, and the like, each of which is equipped with a WEB Browser. The user terminal 200 may include, for example, a wearable device such as a Personal Communication System (PCS), or the like as a wireless communication device that is guaranteed to be portable and mobile. The portable terminal may be any type of handheld-based wireless communication device such as a Personal Communication System (PCS), Global System for Mobile communications (GSM), Personal Digital Cellular (PDC), Personal Handyphone System (PHS), Personal Digital Assistant (PDA), International Mobile Telecommunications (IMT)-2000, Code Division Multiple Access (CDMA)-2000, W-Code Division Multiple Access (W-CDMA), Wireless Broadband (WiBro) Internet terminal, a smart phone, etc., a wearable device such as a watch, a ring, a bracelet, an anklet, a necklace, a pair of glasses, and contact lens, or a head-mounted-device (HMD).

In addition, the terminal 4 may be a server of a company that produces and sells the charging cable 2, a server of a company that manufactures and sells the vehicle 1, a server of a service center of the vehicle 1, a server provided in the charging station, or a server that manages a plurality of charging stations.

Figure 5:
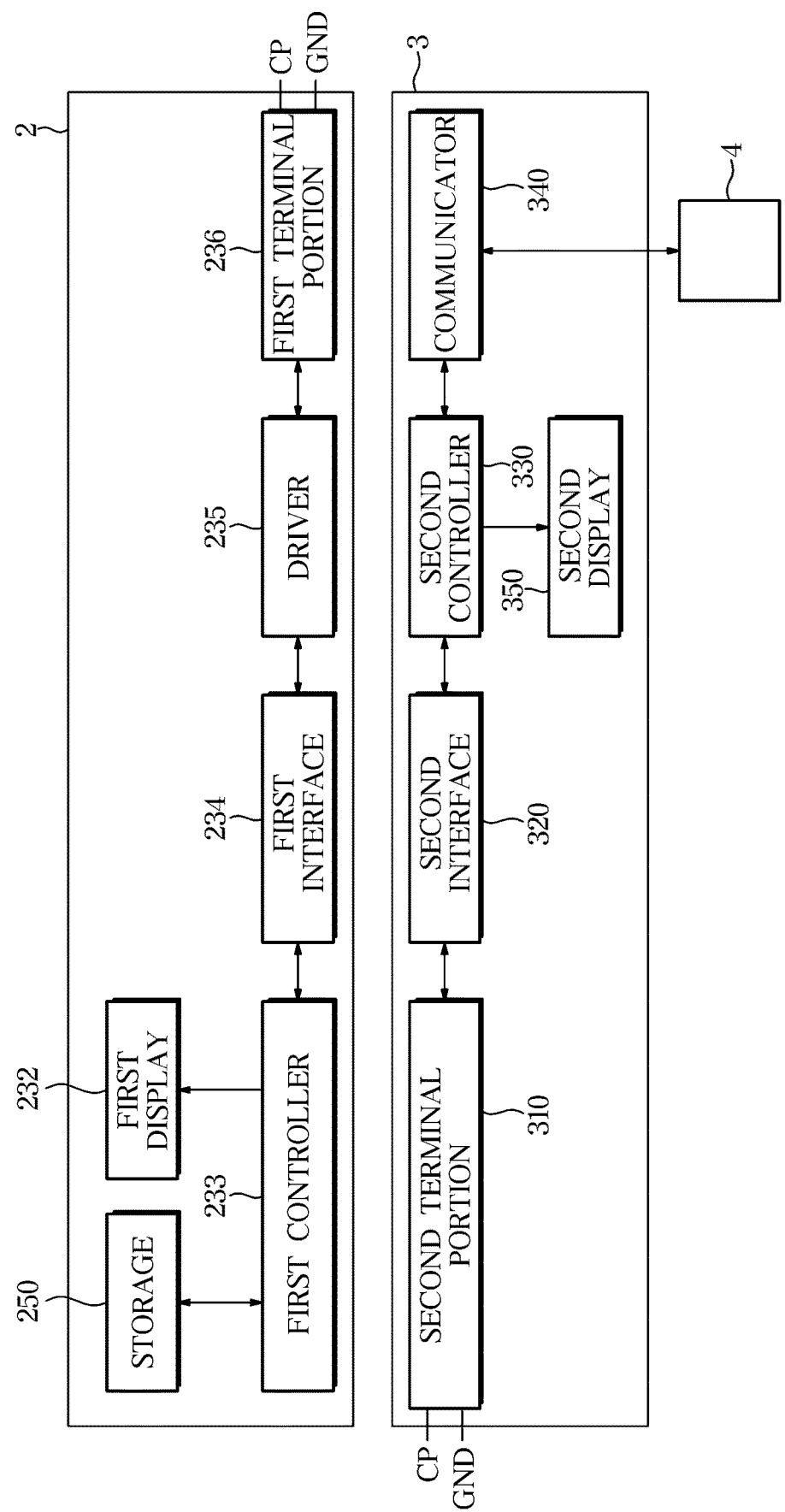
FIG. 5 is a block diagram of a charging cable and a communication device according to embodiments of the disclosure.

FIG. 5 is a control block diagram of a charging cable and a communication device according to embodiments of the disclosure, which is described with reference to FIGS. 6 and 7.

Figure 6:
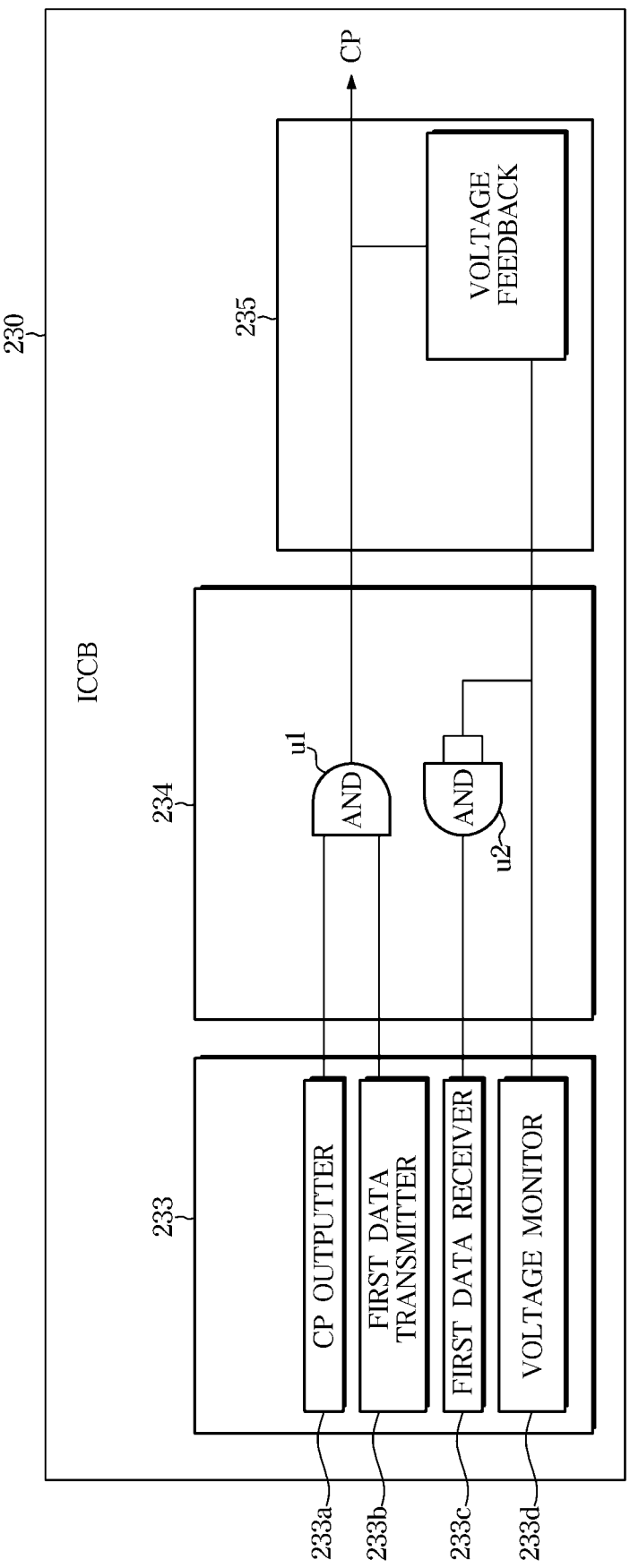
FIG. 6 is a control block diagram of a charging cable according to embodiments of the disclosure.
Figure 7:
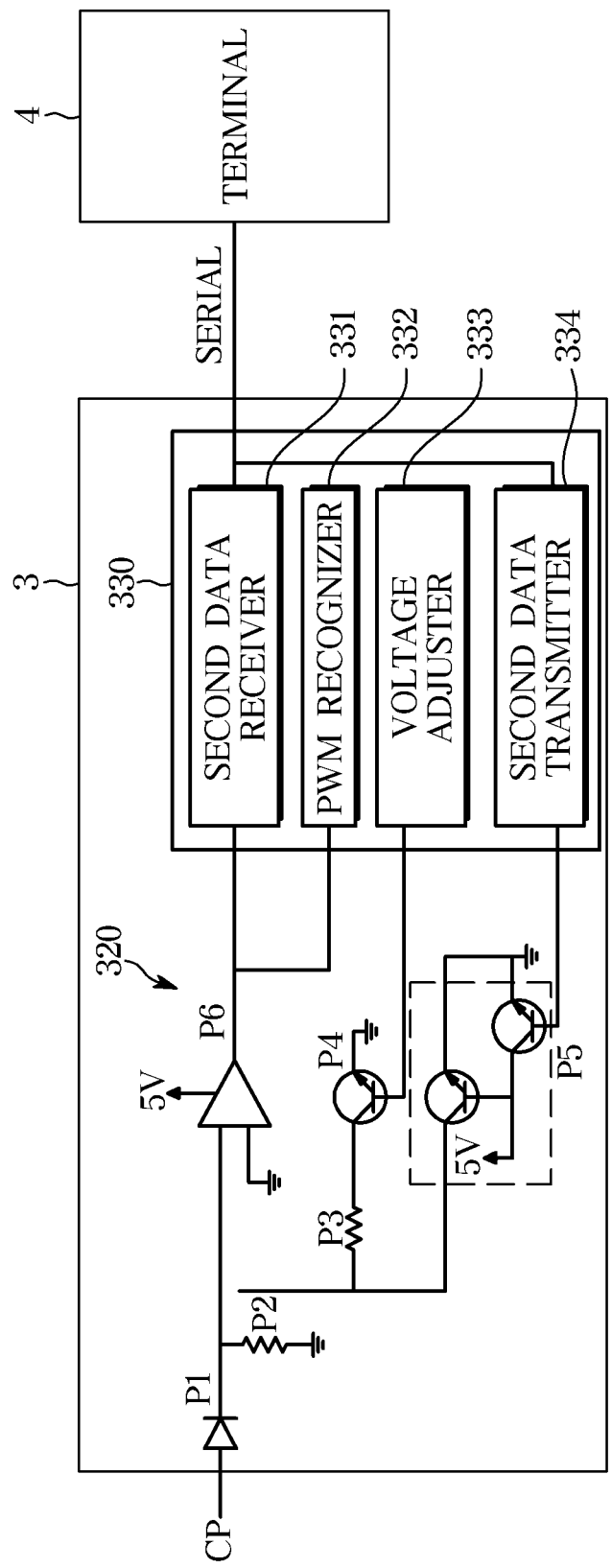
FIG. 7 is a control block diagram of a communication device according to embodiments of the disclosure.

FIG. 6 is a detailed block diagram of a charging cable according to embodiments of the disclosure, and FIG. 7 is a detailed control block diagram of a communication device for performing with a charging cable according to embodiments of the disclosure.

The control box 230 of the charging cable 2 may include a first controller 233, a first interface 234, a driver 235, and a first terminal portion 236.

The first controller 233 may determine whether the connector 210 of the charging cable 2 is connected to the charging inlet 118*c* of the vehicle 1 based on the received signal of the proximity detection pin PD.

The first controller 233 may transmit the connection information of the charging cable 2. At this time, the first controller 233 may transmit the connection information of the charging cable 2 to the vehicle 1 through the control pilot pin CP.

The first controller 233 may communicate with the vehicle 1 through the control pilot pin CP. At this time, the first controller 233 may perform the communication mode for monitoring the SOC of the battery 120 of the vehicle 1 based on the received signal through the control pilot pin CP.

The first controller 233 may receive the charging information of the battery 120 of the vehicle 1 during the charging of the vehicle 1 and may control display of the received charging information.

The first controller 233 may control a ON/OFF state of a switch (not shown) so that external power is transmitted to the vehicle 1 through the live pin L1, the neutral pin L2/N, and the ground pin GND when the vehicle 1 is charged.

The first controller 233 may diagnose a failure of the vehicle 1 by communicating with the vehicle 1 when the vehicle 1 is charged. The first controller 233 may diagnose a failure of various operations related to the charging of the vehicle 1 and store diagnostic information.

The first controller 233 may detect a leakage current to cut off the power during the charging and monitor a grounding state when the vehicle 1 is charged.

The first controller 233 may determine whether to communicate with the communication device 3 based on the signals of the control pilot pin CP and the ground pin.

The first controller 233 may transmit the diagnostic information of the vehicle 1 to the communication device 3 in communication with the communication device 3.

The first controller 233 may control the first display 232 so as to identify the SOC of the battery 120 and display the identified SOC of the battery 120.

The SOC may include a charging entry state, a charging progress state, a charging completion state, and a charging failure state.

When the update information is received from the communication device 3, the first controller 233 may updates the stored software based on the received update information and store information related to the update execution.

The first controller 233 may transmit and receive data to the communication device 3 or the vehicle 1 through the first interface 234.

The first interface 234 may monitor a communication state with the vehicle 1 and the communication device 3 based on a control command of the first controller 233 and transmit the data to the communication device 3 or receive the data from the communication device 3. The first interface 234 may receive a signal corresponding to the communication enabled state from the communication device 3 and a change command signal to the update mode.

The data to be transmitted to the communication device 3 may be the information related to the charging of the vehicle 1, the diagnostic information of the vehicle 1, or identification information of the charging cable 2.

The data received from the communication device 3 may include the data related to the charging of the vehicle 1 and the data related to the update information.

The first interface 234 may communicate between the vehicle 1 and at least one of a Universal Asynchronous Receiver Transmitter (UART) and a Local Interconnect Network (LIN) using the control pilot pin CP of the connector 210.

The driver 235 may output the voltage applied to the control pilot pin CP of the connector 210 to the communication device 3 and monitor the voltage of the control pilot pin CP adjusted by the communication device 3. The monitored voltage may then be input to the first controller 233 through the first interface 234.

As illustrated in FIG. 6, the first controller 233 may include a control pilot outputter (hereinafter, referred to as the 'CP outputter') 233*a*, a first data transmitter 233*b*, a first data receiver 233*c*, and a voltage monitor 233*d*. The interface 234 may include a signal outputter u1 and a first voltage changer u2, and the driver 235 may include a voltage feedback.

The first voltage changer u2 is provided for the stability of data signal transmission and reception, and may be selectively included. That is, the first interface 234 may include only the signal outputter u1.

The CP outputter 233*a* may output the signal corresponding to the connection state of the charging cable 2.

At this time, the signal is a voltage signal, and the size (i.e., value) may be different for each connection state of the charging cable 2.

The connection state of the charging cable 2 may include a state where the charging cable 2 is connected to the commercial power, a state where the charging cable 2 is connected to the vehicle 1, the SOC of the vehicle 1 after the charging cable 2 is connected to the commercial power and the vehicle 1, and a state where the charging cable 2 is connected to the communication device 3. This will be described in more detail.

The CP outputter 233*a* may output the voltage of approximately 12V through the control pilot pin CP when the plug 220 of the charging cable 2 is connected to the commercial power and the charging cable 2 is powered on.

The CP outputter 233*a* may control the pulse width modulation (PWM) of the signal for the voltage across the control pilot pin CP when the connector 210 of the charging cable 2 is connected to the vehicle 1 after the plug 220 of the charging cable 2 is connected to the commercial power.

The CP outputter 233*a* may be a PWM outputter that performs the PWM of the signal of the voltage across the control pilot pin CP.

At this time, the charger 118 of the vehicle 1 may further include a resistor, which may reduce the voltage of the control pilot pin CP of the charging cable 2 (i.e., a positive voltage). The voltage of the control pilot pin CP may be adjusted from approximately +9V to −12V by the resistance provided in the vehicle 1 when the charging cable 2 is connected to the vehicle 1.

The CP outputter 233a may output a PWM signal for the voltage of approximately 9V across the control pilot pin CP of the charging cable 2 when the charging cable 2 is connected to the vehicle 1.

The CP outputter 233a may determine the possibility of charging when the connector 210 of the charging cable 2 is connected to the vehicle 1 after the plug 220 of the charging cable 2 is connected to the commercial power. When it is determined that the charging is possible, the CP outputter 233a may perform a charging preparation state. The CP outputter 233a may control the PWM so that the voltage of approximately 6V is outputted through the control pilot pin CP. At this time, the PWM signal may be outputted together with the control pilot pin CP.

The CP outputter 233a may output the PWM signal with a duty ratio of 100% as a signal corresponding to completion of the change to the update mode.

The PWM signal having the duty ratio of 100% may be the PWM signal for a voltage of approximately 1V across the control pilot pin CP.

The first data transmitter 233b may output a high signal and a low signal corresponding to the data to be transmitted to the communication device 3.

The data to be transmitted to the communication device 3 may be data corresponding to a response signal of the communication device 3 in communication with the communication device 3 or data corresponding to the diagnostic information of the vehicle 1.

The first data receiver 233c may receive the data transmitted from the communication device 3.

The first data receiver 233c may receive the high signal and the low signal and may obtain information corresponding to the received data based on the received high and low signals.

The first data receiver 233c may also receive data transmitted from the vehicle 1.

The first data receiver 233c may recognize a value of an ADC voltage converted from an analog signal of a control pilot voltage (hereinafter, referred to as the 'CP voltage') changed in a second interface 320 (see FIG. 5) to a digital signal.

The voltage monitor 233d may monitor the voltage across the control pilot pin CP. At this time, the first controller 233 may recognize the signal transmitted from the communication device 3 based on the monitored voltage.

The voltage across the control pilot pin CP may differ depending on the connection state and communication state of the charging cable 2.

The voltage across the control pilot pin CP may differ depending on the connection state with the vehicle 1, the charging mode and the communication mode.

The voltage across the control pilot pin CP may differ depending on the communication mode with the communication device 3, i.e. an input of a mode change signal between a normal communication mode and the update mode and an output of the response signal.

For example, the voltage across the control pilot pin CP may be applied the voltage of approximately 9V, which is a first voltage when an identification signal and a communication start signal for a communication enabled state are received. The voltage across the control pilot pin CP may be applied the voltage of approximately 1V, which is a second voltage when the change command signal to the update mode is received.

The first voltage when the identification signal for the communication enabled state or the connection state is received and the second voltage when the change command signal to the update mode is received may be predetermined values.

Also, when communication is in progress, a third voltage may be applied to the control pilot pin CP.

The third voltage is the voltage that enables communication between the charging cable 2 and the communication device 3, and may be a predetermined voltage. For example, the third voltage may be the voltage of approximately 9V.

The voltage monitor 233d may recognize an analog CP voltage changed at the second interface 320 as the value of a digital ADC voltage.

The second voltage corresponding to the change command signal in the update mode may be set to any one of voltage values not used in the international standard.

The signal outputter u1 of the first interface 234 may output either the signal of the CP outputter 233a or the signal of the first data transmitter 233b.

The signal outputter u1 may include a first circuit that includes a plurality of input terminals and outputs only one of the signals input through the plurality of input terminals.

The first circuit may be an integrated circuit, and may be any one of a first AND gate and a multiplexer (MUX).

When the first circuit is implemented with the first AND gate, a first input terminal of the first AND gate may be connected to the CP outputter 233a, a second input terminal of the first AND gate may be connected to the first data transmitter 233b, and an output terminal of the first AND gate may be connected to the control pilot pin CP and the voltage feedback.

When performing charging of the vehicle 1, the first AND gate may receive the high signal through the second input terminal and receive the PWM signal of the CP voltage through the first input terminal.

When performing communication with the vehicle 1, the first AND gate may receive the PWM signal having the duty ratio of 100% through the first input terminal and receive a data signal having the high signal and the low signal through the second input terminal. The PWM signal having the duty ratio of 100% received at the first input terminal may be the high signal.

That is, when performing charging of the vehicle 1, the first controller 233 may output the PWM signal of the CP voltage including the high signal and the low signal to the first input terminal of the signal outputter u1 through the CP outputter 233a, and may output the high signal to the second input terminal through the first data transmitter 233b.

At this time, the connection state of the charging cable 2 can be known during the charging operation based on the PWM signal output through the CP outputter 233a.

When performing communication with the vehicle 1, the first controller 233 may output the PWM signal of the CP voltage having the duty ratio of 100% to the first input terminal of the signal outputter u1 through the CP outputter 233a, and may output the data signal having the high signal and the low signal corresponding to the data to the second input terminal through the first data transmitter 233b.

As described above, the data to be transmitted can be known based on the high signal and the low signal output through the first data transmitter 233b.

The first voltage changer u2 of the first interface 234 may change the magnitude of the voltage of the received signal to the magnitude of the voltage that the first data receiver 233c can recognize. That is, the first voltage changer u2 may be changed from a third voltage for communication to a fourth voltage to be recognized by the first data receiver 233c. The third voltage may be the voltage of approximately 9V and the fourth voltage may be the voltage of approximately 5V.

The first voltage changer u2 may include a second circuit that includes a plurality of input terminals and outputs only one of the signals input through the plurality of input terminals.

The second circuit may be the integrated circuit, and may be any one of a second AND gate and the MUX.

When the second circuit is implemented with the second AND gate, the first and second input terminals of the second AND gate may all be connected to the voltage feedback of the driver and the output terminal may be connected to the first data receiver 233c.

That is, the first voltage changer u2 may receive the signal applied to the control pilot pin CP, change the voltage of the received signal, and transmit the voltage-changed signal to the first data receiver 233c.

At this time, the signal received through the control pilot pin CP may be the high signal and the low signal of the third voltage. The voltage-changed signal may be the high signal and the low signal of the fourth voltage, and may be the signal in which only the magnitude of the voltage is changed while a pulse period of the signal in maintained.

The voltage feedback of the driver 235 may transmit the CP voltage output through the CP outputter 233a to the voltage monitor 233d.

The received signal may be the signal of the voltage adjusted by the communication device 3.

The first terminal portion 236 may be connected to the live pin L1, the neutral pin L2/N, the ground pin GND, the proximity detection pin PD, the control pilot pin CP provided in the connector 210.

When charging the vehicle 1 and communicating with the vehicle 1, the first terminal portion 236 may receive the signal transmitted from the vehicle 1 through the live pin L1, the neutral pin L2/N, the ground pin GND, the proximity detection pin PD, the control pilot pin CP and may transmit the signal to the vehicle 1 through each pin based on the control command of the first controller 233.

When communicating with the communication device 3, the first terminal portion 236 may receive the signal from the communication device 3 through the ground pin GND and the control pilot pin CP and transmit the signal to the communication device 3 through the ground pin GND and the control pilot pin CP.

The first controller 233 may control the charging of the vehicle 1 and monitor the charging of the vehicle 1. In addition, the first controller 233 may be implemented with the memory storing an software to control operation of the components in the charging cable 2 to perform communication with the vehicle 1 and the communication device 3 or the data about the program that implements the software, and the processor carrying out the aforementioned operation using the data stored in the memory. The memory and the processor may be implemented in separate chips. Alternatively, the memory and the processor may be implemented in the single chip.

The control box 230 of the charging cable 2 may further include a storage 250.

The storage 250 may store the identification information of the vehicle 1 and the identification information of the communication device 3.

The storage 250 may also store the diagnostic information of the vehicle 1.

The storage 250 may store the first voltage for recognizing the general communication mode and may store the second voltage for determining the update mode.

The storage 250 may be a memory implemented as a chip separate from the processor associated with the first controller 233, and may be implemented as the single chip with the processor.

The storage 250 may also store the software for controlling the charging of the vehicle 1, monitoring the charging of the vehicle 1, and for communicating with the vehicle 1 and the communication device 3.

The storage 250 may be implemented with at least one of a non-volatile memory device, such as a cache, Read Only Memory (ROM), Programmable ROM (PROM), Erasable Programmable ROM (EPROM), and Electrically Erasable Programmable ROM (EEPROM), a volatile memory device, such as Random Access Memory (RAM), or a storage medium, such as Hard Disk Drive (HDD) and Compact Disk (CD) ROM, without being limited thereto.

As illustrated in FIG. 5, the communication device 3 may include a second terminal portion 310, a second interface 320, and a second controller 330 and may further include a communicator 340.

The communication device 3 may further include a second display 350 that displays communication information with the charging cable 2, communication information with the terminal, update information, and the like.

The second terminal portion 310 may be connected to the connector 210 of the charging cable 2.

The second terminal portion 310 may be connected to the control pilot pin CP and the ground pin GND provided in the connector 210 of the charging cable 2. The second terminal portion 310 may receive the signals of the control pilot pin CP and the ground pin GND of the charging cable 2 and transmit the signals to the control pilot pin CP and the ground pin GND of the charging cable 2.

The second interface 320 may rectify the received signal and change the signal to the signal of the voltage of approximately 9V when the signal of the CP voltage transmitted from the driver of the control box 230 provided in the charging cable 2 is received. The second interface 320 may change back to the signal of the voltage of approximately 5V so that the second controller 330 can recognize it.

The second interface 320 may change the CP voltage to the first voltage or the second voltage based on the control command of the second controller 330.

The second interface 320 may transmit the identification signal for identifying the connection state or the communication enabled state with the charging cable 2 to the charging cable 2 in order to perform communication with the charging cable 2. The second interface 320 may transmit the change command signal to the update mode for performing the update of the charging cable 2 to the charging cable 2. At this time, the identification signal is the signal of the first voltage of approximately 9V, and the change command signal to the update mode of the charging cable 2 is the signal of the second voltage, which is the signal of the voltage of approximately 1V.

The second interface 320 may transmit the data to the charging cable 2 in response to the control command of the second controller 330. The second interface 320 may include at least one switching element for removing noise or the like during the data transmission, and may further include a comparator, and may further include the resistor. The second controller 330 may identify the information of the software stored in the control box 230 of the charging cable 2 in communication with the charging cable 2 and determine whether the updating of the charging cable 2 is necessary based on the identified information of the software.

When it is determined that the charging cable 2 needs to be updated, the second controller 330 may transmit the change command signal to the update mode for changing the communication mode with the charging cable 2 to the update mode to the charging cable 2. The change command signal to the update mode may be the signal of the voltage of approximately 1V, which is the second voltage.

The second controller 330 may maintain the communication state with the charging cable 2 when it is determined that the charging cable 2 needs to be updated.

At this time, the voltage applied to the control pilot pin CP may be 5V, 6V or 12V. The second controller 330 may obtain the response signal of the charging cable 2 corresponding to the received PWM signal of the CP voltage and may identify the communication state with the charging cable 2 and the communication mode of the charging cable 2 based on the obtained response signal.

The second controller 330 may transmit the received diagnostic information to the server when the diagnostic information of the vehicle 1 is received from the charging cable 2 and may transmit the information for correcting the error of the vehicle 1 to the charging cable 2.

As illustrated in FIG. 7, the second interface 320 of the communication device 3 may include a second voltage changer. The second controller 330 may include a second data receiver 331, a PWM recognizer 332, a voltage adjuster 333, and a second data transmitter 334.

The second voltage changer of the second interface 320 may include a diode P1 that rectifies the signal of the CP voltage received through the charging cable 2, a first resistor P2 that changes the signal of the voltage rectified by the diode P1 to the voltage of approximately 9V and 0V, and a comparator P6 that changes the voltage of the changed 9V and 0V back to the voltage of approximately 5V and 0V and output the signal of the changed voltage to the second controller 330.

The second voltage changer of the second interface 320 may output the voltage of approximately 9V based on the control command of the second controller 330 upon transmission of the identification signal for identifying the communication enabled state corresponding to the connection with the charging cable 2. The second voltage changer of the second interface 320 may further include a second resistor P3 and a first switch P4 for outputting the voltage of approximately 1V based on the control command of the second controller 330 upon the transmission of the change command signal in the update mode.

The first switch P4 may be an NPN (negative-positive-negative) transistor. The second resistor P3 may be connected to a collector terminal of the first switch P4 and the second controller 330 may be connected to a base terminal of the first switch P4.

The second interface 320 may include a second switch P5 that inverts the signal corresponding to data transmitted from the second controller 330 and removes noise included in the signal. This allows the charging cable 2 to receive the signal stabilized and minimized in noise.

The second switch P5 may include two NPN transistors.

In addition, the first and second switches are not limited to NPN transistors, and various switch elements other than NPN transistors may be implemented.

Figure 8:
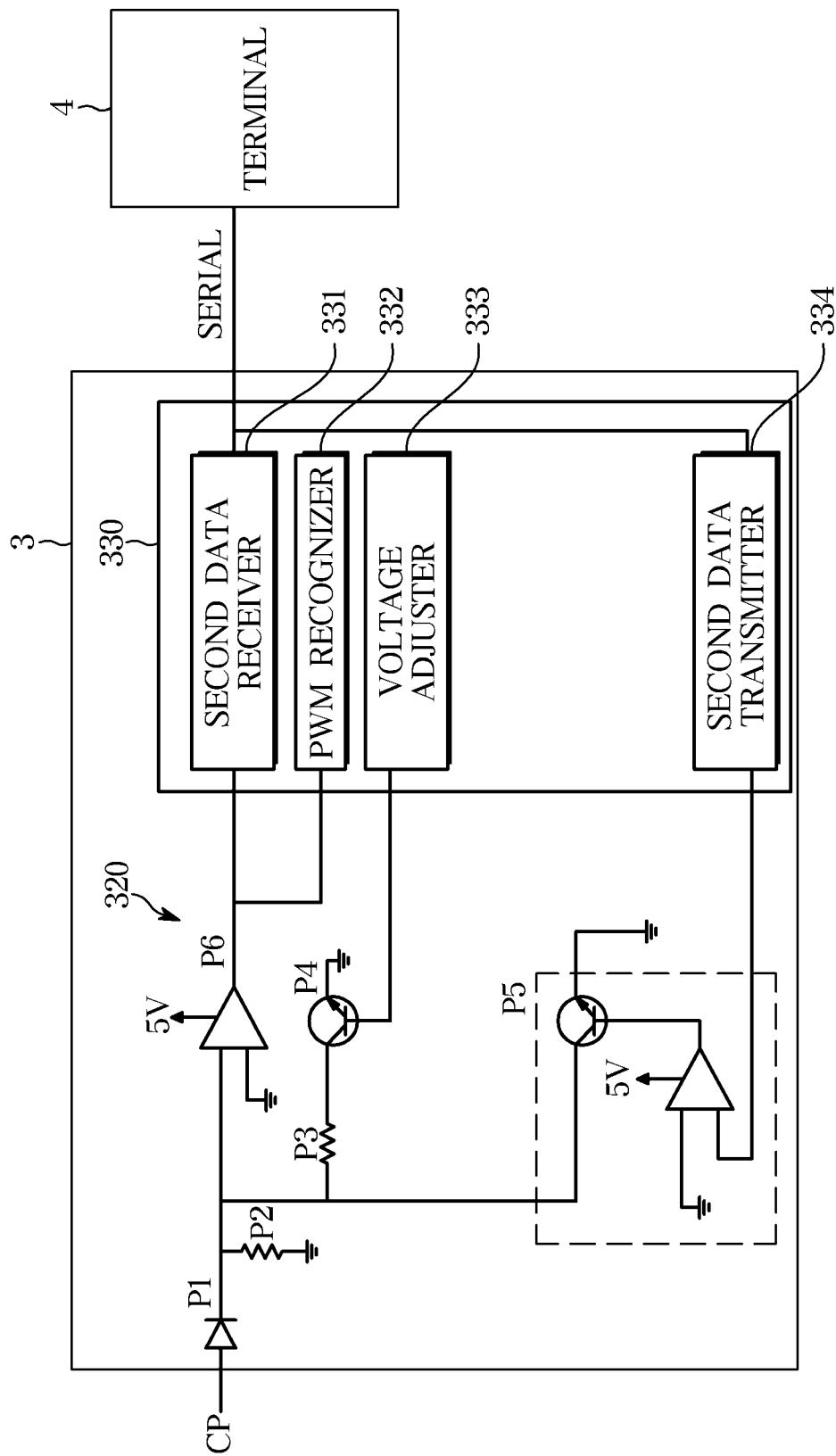
FIG. 8 is a view illustrating another example of a communication device according to embodiments of the disclosure.

As illustrated in FIG. 8, the second interface 320 may include one NPN transistor and the comparator for data transmission.

Figure 9:
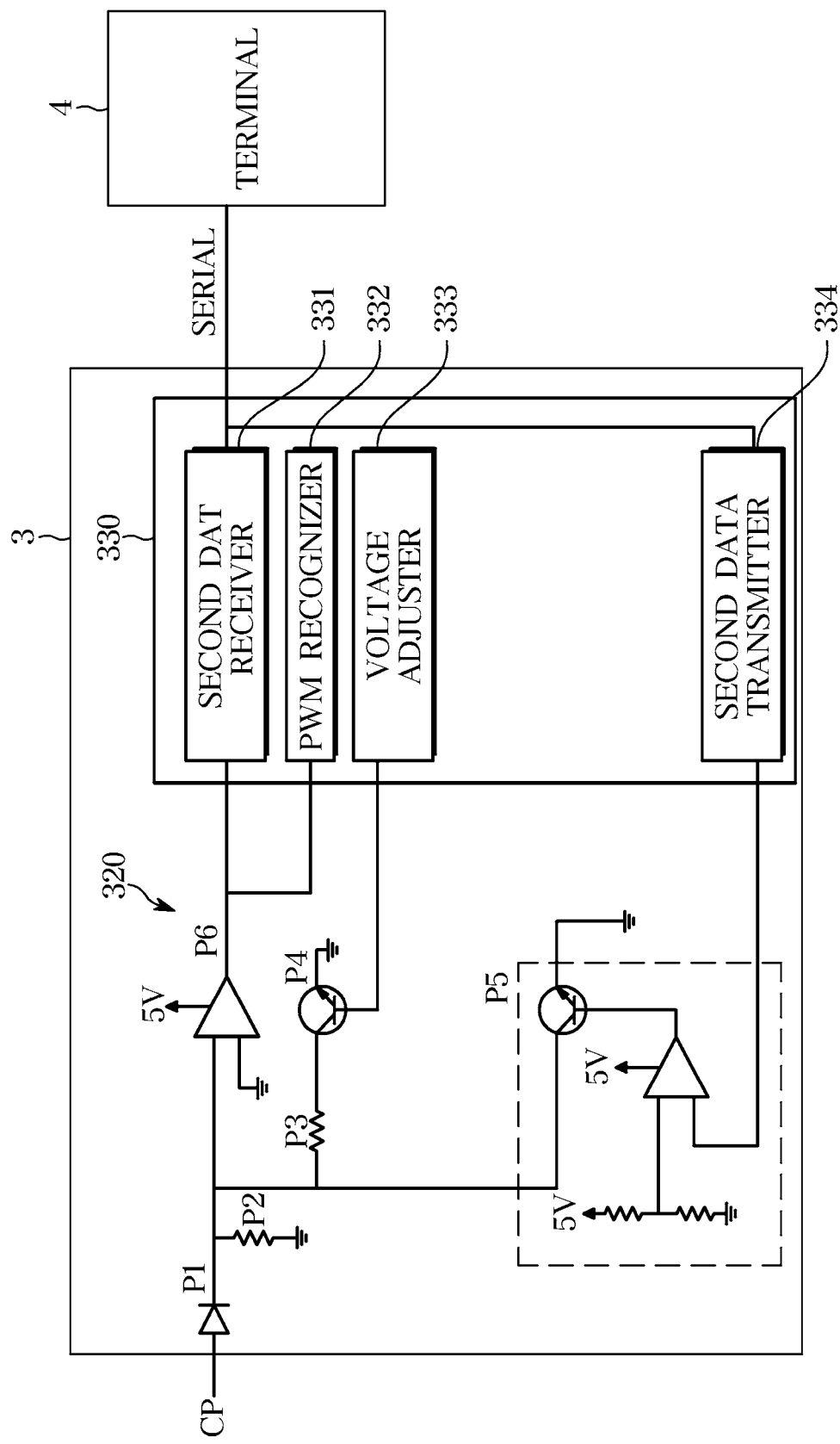
FIG. 9 is a view illustrating another example of a communication device according to embodiments of the disclosure.

As illustrated in FIG. 9, the second interface 320 may further include the NPN transistor, the comparator, and at least one resistor for data transmission. In some embodiments, two resistors were used.

The second data receiver 331 of the second controller 330 may obtain an operating state of the charging cable 2 based on the signal of the voltage changed by the second voltage changer of the second interface 320.

The obtaining the operating state of the charging cable 2 may include obtaining the data corresponding to the operating state of the charging cable 2 by recognizing the voltage across the control pilot pin CP.

The second data receiver 331 may perform a function of a voltage recognizer which recognizes the voltage corresponding to the connection state of the charging cable 2 and the voltage adjusted by the PWM signal controlled by the charging cable 2.

The second data receiver 331 may recognize the connection state with the charging cable 2 by recognizing the voltage changed by the second voltage changer when the voltage is supplied from the charging cable 2 by connection with the charging cable 2. The recognition with the charging cable 2 may be the recognition of the charging cable 2 and the communication enabled state. At this time, the voltage recognized by the second data receiver 331 may be the voltage of approximately 5V.

The second data receiver 331 may recognize the voltage value corresponding to the response signal transmitted from the charging cable 2.

For example, after the charging cable 2 and the communication device 3 are connected and the voltage of 9V is applied to the control pilot pin CP, when the voltage is adjusted by the PWM signal with the duty ratio of 20% corresponding to the communication enabled state, the first data receiver 233c may recognize the adjusted voltage value.

When the voltage of 1V is applied to the control pilot pin CP and the voltage is adjusted by the PWM signal with the duty ratio of 100% during transmission of the change command signal to the update mode is transmitted on the charging cable 2, the second data receiver 331 may recognize the adjusted voltage value.

The second data receiver 331 may receive the data for the updating the software of the charging cable 2 from the terminal 4.

The PWM recognizer 332 of the second controller 330 may recognize the PWM signal of the voltage signal changed by the second voltage changer of the second interface and determine whether or not the response signal is output from the charging cable 2 based on the recognized PWM signal.

The voltage adjuster 333 of the second controller 330 may instruct the output of the first voltage to the second voltage changer of the second interface 320 when starting communication with the charging cable 2, and may instruct the output of the second voltage to the second voltage changer of the second interface 320 for transmission of the change command signal to the update mode when it is determined that the update information is present or that the updating of the charging cable 2 is necessary.

When it is determined that the change from the charging cable 2 to the update mode is completed, the voltage adjuster 333 may instruct the output of the first voltage to the second voltage changer of the second interface 320 to inform the start of transmission of the update data corresponding to the update information.

The voltage adjuster 333 may instruct the output the third voltage to the second voltage changer of the second interface 320 when communicating with the charging cable 2. The third voltage may be the voltage for communication when transmitting and receiving information between the communication device 3 and the charging cable 2. For example, the third voltage may be 9V.

The data transmitter 334 may transmit the data to the charging cable 2 when communicating with the charging cable 2 and transmit the update data when the response signal for changing from the charging cable 2 to the update mode is received.

The communication device 3 may further include a storage (not shown) that stores the update information for updating the software of the charging cable 2.

The communication device 3 may further include the second display 350 that displays the communication information with the charging cable 2 and the terminal 4, the stored update information, performing update information, and the like.

The communication device 3 may receive the update information for updating the software of the charging cable 2 from the external terminal 4. At this time, the communication device 3 may communicate with the terminal 4 and store the update information provided by the terminal 4. The communication device 3 may update the software of the charging cable 2 while receiving the update information provided from the terminal 4.

That is, the communication device 3 may further include the communicator 340 for communicating with the external terminal 4.

The communicator 340 of the communication device 3 may include one or more components that enable communication with the second controller 330, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wired communication module may further include a local interconnect network (LIN) module.

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

Figure 10:
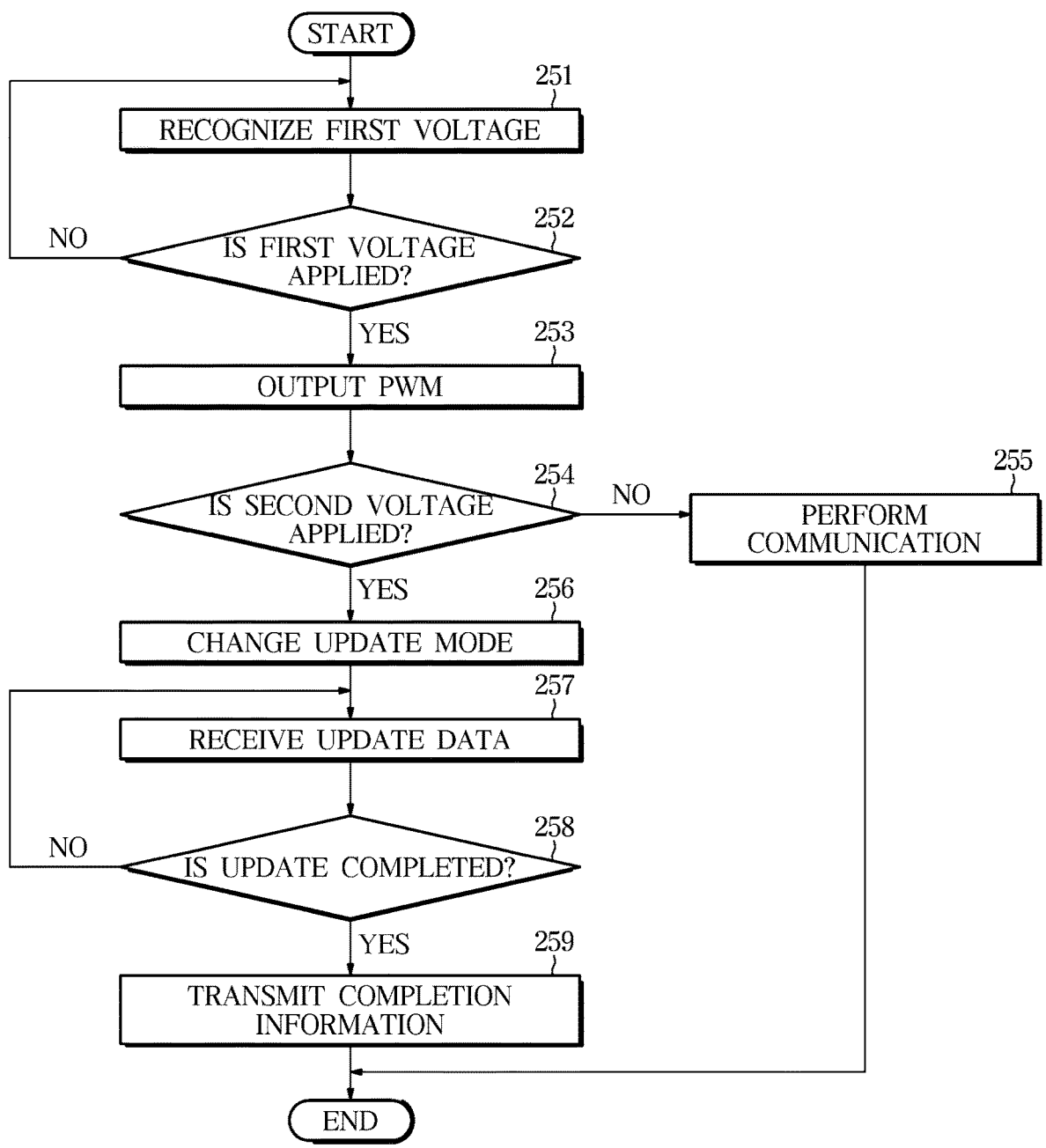
FIG. 10 is a control flowchart of a charging cable according to embodiments of the disclosure.

FIG. 10 is a control flowchart of a charging cable according to embodiments of the disclosure.

The charging cable 2 may communicate with the communication device 3 when the connector 210 is connected to the second terminal portion 310 of the communication device 3 after the plug 220 is connected to the commercial power.

At this time, the charging cable 2 may recognize the CP voltage of the control pilot pin CP (251).

More specifically, the charging cable 2 may recognize the voltage of approximately 12V across the control pilot pin CP when the plug 220 is connected to the external commercial power. And the charging cable 2 may recognize the changed voltage of the control pilot pin CP when the control pilot pin CP and the ground pin GND are connected to the communication device 3.

The changed voltage of the control pilot pin CP may be the voltage of approximately 9V, which is the CP voltage changed by the diode P1 and the resistor inside the communication device 3.

That is, the charging cable 2 may recognize the changed voltage at the communication device 3 through the control pilot pin CP and the voltage feedback.

The charging cable 2 may determine whether the recognized CP voltage is the first voltage (252). When it is determined that the recognized CP voltage is not the first voltage, the charging cable 2 may determine that communication with the communication device 3 is impossible. At this time, the charging cable 2 may determine that the connection with the communication device 3 has failed.

The first voltage may be the voltage of approximately 9V.

Further, when it is determined that the recognized CP voltage is not the first voltage, the charging cable 2 may determine that a communication error with the communication device 3 has occurred and output the communication error.

When it is determined that the recognized CP voltage is the first voltage, the charging cable 2 may determine that it is connected to the communication device 3 and monitor the states of the components of the control box 230 to determine whether normal communication with the communication device 3 is possible. When it is determined that the normal communication with the communication device 3 is possible, the charging cable 2 may output the PWM signal having a predetermined first duty ratio (253). The first duty ratio may be the duty ratio of 20%.

The charging cable 2 may output the PWM signal having the duty ratio of 20% as a communicable response signal for a communication request of the communication device 3 to the communication device 3.

Through which the charging cable 2 may communicate with the communication device 3.

The charging cable 2 may periodically recognize the CP voltage while communicating with the communication device 3 and determine whether the recognized CP voltage is the second voltage (254). When it is determined that the recognized CP voltage is not the second voltage, the charging cable 2 may maintain the communication with the communication device 3 (255). When it is determined that the recognized CP voltage is the second voltage, the charging cable 2 may change to the update mode (256), and output the PWM signal of a predetermined second duty ratio.

The second duty ratio may be the duty ratio of 100%.

The PWM signal having the duty ratio of 100% may be the signal indicating that the change to the update mode is completed.

The second voltage may be the voltage of approximately 1V.

The charging cable 2 may periodically recognize the CP voltage after outputting the PWM signal having the duty ratio of 100%, and determine whether the recognized CP voltage is the first voltage. When it is determined that the recognized CP voltage is the first voltage, the charging cable 2 may determine that the communication device 3 has recognized the mode change and prepare the update to receive the data for updating.

In other words, the charging cable 2 may recognize whether the communication device 3 has recognized the completion of the change of the charging cable 2 to the update mode by recognizing the changed CP voltage at the communication device 3. That is, the charging cable 2 may determine that the communication device 3 has recognized that it is preparing to the update.

Thus, the charging cable 2 may perform preparation for software update when it is determined that the recognized CP voltage is the first voltage, receive the data for updating from the communication device 3 (257), and perform the software update based on the received update data.

The charging cable 2 may transmits the response signal corresponding to the execution of the software update to the communication device 3.

The charging cable 2 may determine whether the update is completed (258). When it is determined that the software update is completed, the charging cable 2 may transmit completion information to the communication device 3 (259) and perform communication with the communication device 3.

Figure 11:
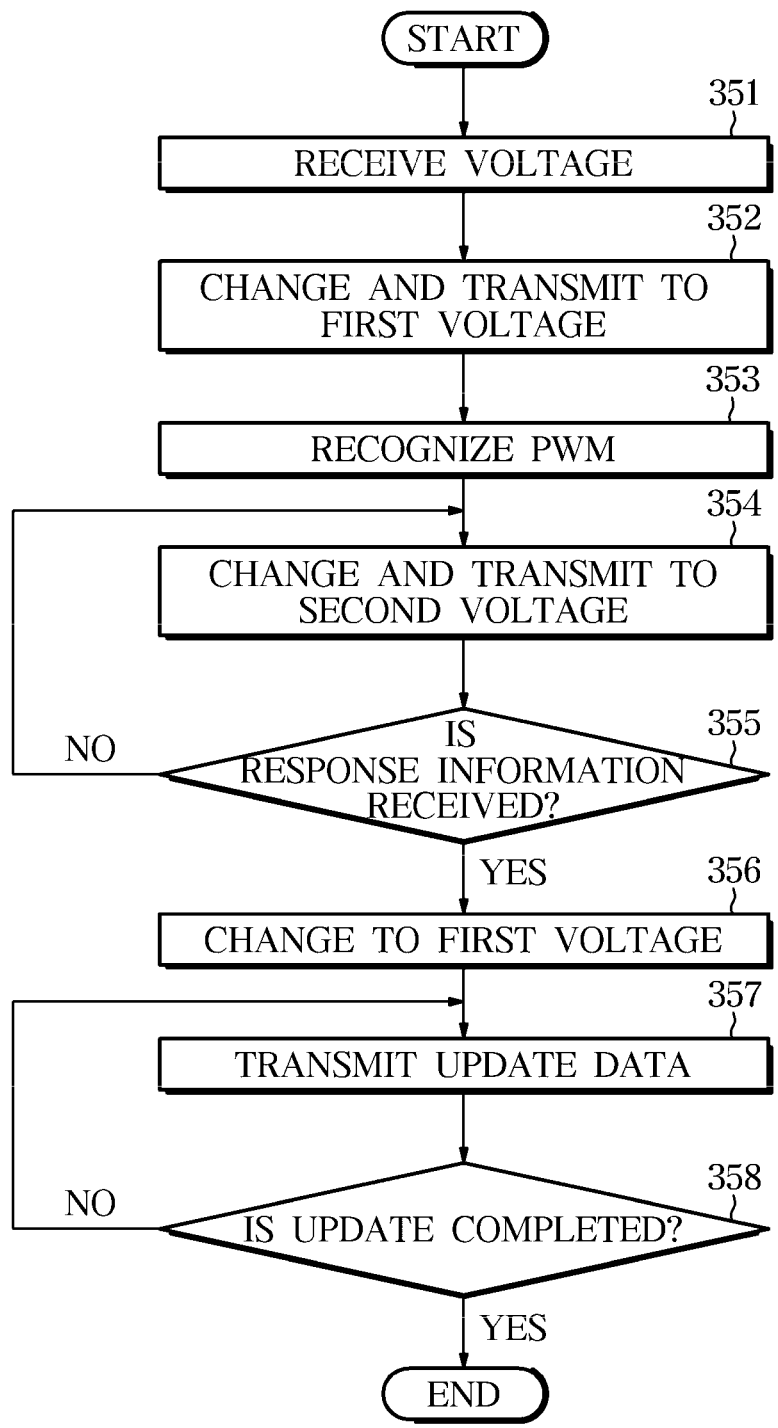
FIG. 11 is a control flowchart of a communication apparatus according to embodiments of the disclosure.

FIG. 11 is a control flowchart of a communication apparatus according to embodiments of the disclosure.

The communication device 3 may change the voltage applied to the control pilot pin CP to the voltage to be recognized by the second controller 330 when the voltage of the external power is received (351). The reception of the voltage of the external power may include that the voltage of the external power through the control pilot pin CP and the ground pin GND of the charging cable 2 is received.

To change the voltage to be recognized by the second controller 330 of the communication device 3 may be such that the applied voltage is changed to the voltage of approximately 9V by the diode P1 and the resistor provided inside the communication device 3 when the voltage of 12V is applied through the control pilot pin CP and the changed voltage of 9V is changed to the voltage of approximately 5V to be recognized by the second controller 330 by the comparator provided inside the communication device 3.

In addition, the communication device 3 may change the CP voltage to the first voltage when a power on command of an internal power supply (not shown) is received and connection completion information of the charging cable 2 is received.

The reception of the connection completion information of the charging cable 2 may include that the signal of the voltage of approximately 5V is recognized.

When the signal of the voltage of approximately 5V is recognized, the communication device 3 may change the voltage of the control pilot pin CP to the first voltage (352). The first voltage is the voltage for identifying whether or not the communication is enabled, and may be the voltage of approximately 9V.

At this time, the communication device 3 may transmit the signal corresponding to the communication enabled state to the PWM signal of the first duty ratio. That is, the communication device 3 may recognize the PWM signal in the CP voltage (353).

The recognition of the PWM signal in the CP voltage may include that the voltage received through the connector 210 of the charging cable 2 is converted to the voltage of approximately 5V that the second controller 330 can recognize and the high signal and the low signal included in the signal of the converted voltage is recognized.

The communication device 3 may determine that the normal communication with the charging cable 2 is possible when it is determined that the recognized PWM signal is the PWM signal of the first duty ratio. The first duty ratio PWM signal may be the PWM signal having the duty ratio of 20%.

The communication device 3 may identify the software information of the control box 230 of the charging cable 2 and determine whether the software of the control box 230 of the charging cable 2 needs to be updated based on the identified software information. When it is determined that the software needs to be updated, the communication device 3 may change the CP voltage to the second voltage (354). The second voltage may be the voltage of approximately 1V.

In addition, the second voltage may be 3V, 6V, 9V or 12V.

Further, upon receiving the change command signal of the update mode, the communication device 3 may transmit the PWM signal of the second duty ratio corresponding to receipt identification of the change command of the update mode.

The communication device 3 may determine whether the response is received from the charging cable 2 (355).

Determining whether the response signal has been received may include determining whether the signal that corresponds to the completion of the change to the update mode of the communication device 3 has been received.

The communication device 3 may determine whether the response is received by recognizing the PWM signal transmitted by the charging cable 2 and determining whether the recognized PWM signal is the PWM signal of the second duty ratio.

The PWM signal of the second duty ratio may include the PWM signal of the duty ratio of 100%.

The communication device 3 may recognize that the change of the update mode is completed in the charging cable 2 when the recognized PWM signal is the PWM signal of the duty ratio of 100%.

That is, the communication device 3 may change the CP voltage to the first voltage when it is determined that the response has been received (356). At this time, the communication device 3 may recognize the first voltage with the CP voltage. Through this, the communication device 3 may inform the charging cable 2 that the charging cable has recognized the completion of the change to the update mode.

The communication device 3 may change the CP voltage to the first voltage and transmit the update data for updating after a predetermined time elapses. When transmitting the update information, the communication device 3 may classify the update data into a plurality of pieces of data and transmit the pieces of the update data one by one at regular intervals. At this time, the communication device 3 may receive the response signal corresponding to the reception of the update data from the charging cable 2 at the regular intervals. The communication device 3 may also transmit a next update data to the charging cable 2 when the response signal is received.

The communication device 3 may periodically identify whether it is connected to the charging cable 2 when transmitting the update data.

Also, the communication device 3 may identify and store the transmitted update data and the non-transmitted update data when the communication with the charging cable 2 is blocked during transmitting the update data. In this case, the communication device 3 may transmit only the update data that has not yet been transmitted when it is connected to the charging cable 2 in the future.

The communication device 3 may determine whether the update has been completed (358). When it is determined that the update of the software is completed, the communication device 3 may complete the transmission of the update information and change to the normal communication mode. In addition, the communication device 3 may transmit transmission completion information of the update information to the charging cable 2.

In the normal communication mode with the charging cable 2, the communication device 3 may identify the diagnostic information stored in the control box 230 of the charging cable 2 and transmit information for correcting the error to the charging cable 2.

The communication device 3 may receive the update data for updating the software of the charging cable 2 from the external terminal 4.

As is apparent from the above description, the embodiments of the disclosure may update the software of the control box without breaking the case of the control box provided in the charging cable by connecting the communication device to the connector of the charging cable and updating the software of the control box.

Since the case of the control box is not broken when updating the software of the control box, it is possible to prevent various parts in the control box from being damaged, and the cost can be prevented from being spent due to the case breakage.

Further, the present disclosure may allow charging of the vehicle to be performed using enhanced software without replacing the control box of the charging cable.

The disclosure may very easily update the software of the control box provided in the charging cable with a simple action of connecting the communication device to the connector of the charging cable without the hassle of unlocking the fastening member such as the bolt that joins the case of the control box.

Since the disclosure eliminates the fastening member such as the bolt that joins the case of the control box, the size and weight of the charging cable can be prevented from increasing. That is, since the size of the charging cable can be reduced and the weight of the charging cable can be reduced, the portability of the user may be improved.

In addition, since the disclosure does not require the wireless communication module for software update to be mounted on the control box, it is possible to prevent the cost increase due to the mounting of the wireless communication module.

The disclosure may prevent the cost increase of a software update circuit because the software is updated using the two end gates provided in the control box of the charging cable.

The disclosure may improve merchantability of the charging cable of the eco-friendly vehicles, further increase the satisfaction of the user, and secure the competitiveness of the product.

Meanwhile, the disclosed embodiments may be implemented in the form of recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

The invention claimed is:

1. A charging cable comprising:
   a plurality of pins;
   a storage configured to store software, which controls communication with a communication device connected through at least one of the plurality of pins, controls communication with a charging object connected through the plurality of pins, controls charging of the charging object and monitors the charging; and
   a controller configured to:
      when a first voltage is applied to the at least one pin of the plurality of pins, identify that the at least one pin is connected to the communication device, control a normal communication mode, control to output a pulse width modulation (PWM) signal having a predetermined first duty ratio as a communicable response signal for a communication request of the communication device through the at least one pin;
      when a second voltage is applied to the at least one pin, change the normal communication mode to an update mode, and control to output the PWM signal having a predetermined second duty ratio corresponding to the change to the update mode through the at least one pin; and
      when the first voltage is applied to the at least one pin of the plurality of pins again, prepare to update the software, receive data for updating from the communication device, and update the software based on the received data;
      wherein the first voltage is greater than the second voltage, and the predetermined first duty ratio is smaller than the predetermined second duty ratio.

2. The charging cable according to claim 1, wherein the controller comprises:
   a data transmitter configured to transmit data when communicating with the communication device; and
   a control pilot (CP) outputter configured to output the PWM signal of the first duty ratio or the PWM signal of the second duty ratio.

3. The charging cable according to claim 2, further comprising:
   a signal outputter configured to output either a signal corresponding to the data input from the data transmitter or the PWM signal input from the CP outputter.

4. The charging cable according to claim 3, wherein the at least one pin comprises a control pilot pin, and wherein the signal outputter comprises a first input terminal to which the CP outputter is connected, a second input to which the data transmitter is connected, and an output terminal coupled to the control pilot pin.

5. The charging cable according to claim 2, wherein the data transmitter is configured to output a high signal when outputting the PWM signal of the first duty ratio or the PWM signal of the second duty ratio through the CP outputter.

6. The charging cable according to claim 2, wherein the CP outputter is configured to output the PWM signal having a duty ratio of 100% when the data is transmitted through the data transmitter.

7. The charging cable according to claim 1, wherein the at least one pin comprises a control pilot pin CP,
the charging cable further comprising:
a voltage changer configured to change a voltage applied to the control pilot pin CP to a voltage to be recognized by the controller.

8. The charging cable according to claim 7, wherein the voltage changer comprises:
a plurality of input terminals; and
a second circuit configured to output any one of a plurality of signals input through the plurality of input terminals.

9. The charging cable according to claim 1, further comprising:
a connector provided with the plurality of pins;
a plug configured to connect to external commercial power; and
a control box provided between the connector and the plug, the control box having a case accommodating the controller and the storage,
wherein the case is provided in a hermetically sealed manner.

10. A communication device comprising:
a terminal portion connected to two pins of a plurality of pins provided on a charging cable; and
a controller configured to:
when a voltage of the charging cable is applied to the two pins, adjust the voltage of the two pins to a first voltage to identify a communication enabled state with the charging cable;
when a pulse width modulation (PWM) signal of a predetermined first duty ratio is received through the two pins, perform communication with the charging cable;
when it is determined that updating of software in the charging cable is necessary during communication with the charging cable, adjust the voltage of the two pins to a second voltage; and
when the PWM signal of a predetermined second duty ratio is received through the two pins, control to transmit data for updating to the charging cable;
wherein the controller is further configured to:
when the PWM signal of the first duty ratio is received, determine that communication with the charging cable is enabled; and
when the PWM signal of the second duty ratio is received through the two pins, determine that the charging cable has been changed to an update mode;
wherein the controller is configured to change the voltage of the two pins to the first voltage to inform transmission of the data for updating when the PWM signal of the second duty ratio is received; and
wherein the voltage is greater than the second voltage, and the predetermined first duty ratio is smaller than the predetermined second duty ratio.

11. The communication device according to claim 10, further comprising:
a diode and resistors configured to change the applied voltage to a voltage to be recognized by the controller when the voltage of the charging cable 2 is applied to the two pins.

12. The communication device according to claim 11, further comprising:
at least one switch element configured to perform at least one of inverting a signal and removing noise corresponding to the data when transmitting the data for updating.

13. The communication device according to claim 12, further comprising:
a comparator and at least one resistor configured to perform at least one of inverting the signal and removing the noise corresponding to the data.

14. The communication device according to claim 10, wherein the controller is configured to transmit data for updating at a predetermined time interval when updating the software of the charging cable, and to receive a response signal from the charging cable at the predetermined time interval.

15. The communication device according to claim 10, further comprising:
a communicator configured to communicate with an external terminal,
wherein the controller is configured to control the updating of the charging cable based on update information received through the communicator.

16. The communication device according to claim 15, wherein the controller is configured to store the update information received through the communicator.

17. The communication device according to claim 10, further comprising:
a display configured to display at least one of communication information and update information with an interface.

18. A method of controlling a charging cable comprising:
when a voltage received through a control pilot pin of a plurality of pins is a first voltage, identifying that the control pilot pin is connected to the communication device, controlling a normal communication mode, and outputting a pulse width modulation (PWM) signal of a first duty ratio as a response signal for a communication request of the communication device;
when the voltage applied through the control pilot pin is a second voltage, changing the normal communication mode to an update mode and outputting the PWM signal of a second duty ratio as a response signal for changing to the update mode;
when the voltage applied through the control pilot pin is the first voltage, recognizing received data as the data for updating; and
updating software using the received data;
wherein the first voltage is greater than the second voltage, and the first duty ratio is smaller than the second duty ratio.

19. A method of controlling a communication device comprising:
when a voltage is applied through two pins of a plurality of pins provided on a charging cable, changing the voltage applied to the two pins to a first voltage;
when receiving a pulse width modulation (PWM) signal of a first duty ratio corresponding to the first voltage, performing communication with the charging cable;

determining whether an update of the charging cable is necessary;

when it is determined that updating of the charging cable is necessary, changing the voltage applied to the two pins to a second voltage;

when the PWM signal of a second duty ratio corresponding to the second voltage is received, determining that the charging cable has been changed to an update mode, and changing the voltage applied to the two pins to the first voltage; and transmitting data for updating to the charging cable;

wherein the first voltage is greater than the second voltage, and the first duty ratio is smaller than the second duty ratio.

20. The method according to claim 19, wherein the transmitting of the data for updating to the charging cable comprises:

transmitting the data for updating at a predetermined time interval;

determining whether a response signal is received from the charging cable at the predetermined time interval; and maintaining transmission of the data for updating when the response signal is received from the charging cable.

21. The method according to claim 19, further comprising:

performing communication with an external terminal;

receiving the data for updating from the external terminal; and transmitting the received data for updating to the charging cable.

\* \* \* \* \*